United States Patent
Han et al.

(10) Patent No.: US 7,621,415 B2
(45) Date of Patent: Nov. 24, 2009

(54) STORAGE FOR INTERACTIVE DISPLAY SYSTEM

(75) Inventors: Allen Han, Kirkland, WA (US); Dana Lu Silverstein, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 11/189,152

(22) Filed: Jul. 25, 2005

(65) Prior Publication Data

US 2007/0022369 A1   Jan. 25, 2007

(51) Int. Cl.
*B65D 25/00* (2006.01)

(52) U.S. Cl. ........................................................ 220/9.4

(58) Field of Classification Search .............. 220/4.02, 220/9.1–9.4, 493, 668; 108/25, 50.11, 150; 312/4, 7.2, 287; 383/40, 43, 83; 160/368.1
See application file for complete search history.

(56) References Cited

U.S. PATENT DOCUMENTS 2,517,757 A  *  8/1950  Adlerstein .................... 312/3
5,775,496 A  *  7/1998  Cyr ........................... 206/316.1
5,779,366 A  *  7/1998  McKenzie et al. ............ 383/22
5,913,582 A  *  6/1999  Coonan .................... 312/223.3
6,595,687 B2 *  7/2003  Godshaw et al. ............... 383/6

* cited by examiner

*Primary Examiner*—Harry A Grosso
(74) *Attorney, Agent, or Firm*—Workman Nydegger

(57) ABSTRACT

A storage is provided for an interactive display system that both provides a graphic display and responds to objects disposed proximate to or in contact with a display surface. Due to a limited available volume within a housing of the interactive display system, the storage is provided either external to the housing, or within a peripheral portion of the housing so as not to interfere with the operation of the interactive display system. In one embodiment, a sheet of flexible material is coupled to an exterior surface of the housing. Elastomeric edges of the sheet are pulled away from the housing to provide access to a volume disposed between the sheet and the external surface of the housing. In another embodiment, pockets are formed within a sheet hung from a backing, adjacent to the external surface. Yet another embodiment includes a drawer within a peripheral portion of the display.

8 Claims, 5 Drawing Sheets

STORAGE FOR INTERACTIVE DISPLAY SYSTEM

BACKGROUND

A novel interactive display system has been developed that serves as both a display on which text and graphics are presented to a user, and as an input device for enabling a user to interact with the system and displayed images using, for example, the user's fingers or hands, or physical objects that are manipulated by the user. Unlike a conventional touch screen, the interactive display system is not constrained to recognize simply a single point of contact on the display screen, but instead, can respond to multiple points of contact, or the shape of objects, as well as encoded markings on objects. Accordingly, various objects such as game pieces will often be used during such interactions. As more software is made available to a user of the interactive display system, it is likely that the number of game pieces and other physical objects that are used in connection with the interactive display system will dramatically increase in number. The user will thus need an efficient way to store these objects when not in use, so that they are readily available when needed to play a game or carryout some other form of interaction with the interactive display system.

Physical objects that might be used with the interactive display system will include articles such as game pieces, e.g., the various pieces used to play chess on the display surface, as well as other articles, such as cards, die, tiles, etc. Keeping such objects in their original boxes makes them less accessible, particularly if the boxes must be stored away from the interactive display system, e.g., in a separate room or location. Also, because initial embodiments of the interactive display system require unobstructed optical paths within a housing below the display surface, there is little option to provide a large space for storing objects within the housing. Accordingly, it is likely that users of the interactive display system will need readily available storage for physical objects used with the interactive display system, so that the objects can readily be accessed and used with the system and after their use, efficiently placed back into the storage.

SUMMARY

In consideration of the need to provide efficient access to objects that are used with an interactive display system, several embodiments have been developed for such storage. Each embodiment of the storage includes a volume that is selectively accessible for storage of objects, including objects that may be usable with the interactive display system. In at least one embodiment, the volume is disposed proximate to a peripheral portion of the interactive display system so that a housing of the interactive display system at least supports the storage. In each case, the volume is configured and disposed relative to the interactive display system so as to avoid interference with its operation.

Also provided is a member that is adapted to be engaged by a user to selectively access the volume. For example, this member can comprise a handle, an edge of the sheet of material that is not coupled to the housing, an edge of an opening formed in the sheet of material, or a part of the housing that is movable relative to another part of the housing.

In one or more embodiments, the volume is disposed between a sheet of a flexible material and an outer surface of the housing. The sheet of material is coupled to the housing adjacent at least opposite edges of the sheet, but optionally, may only be coupled to the housing along one edge. An elastomeric component is disposed along an edge of the material in one embodiment of the storage. This elastomeric component urges the flexible material toward the housing to close an opening providing access into the volume. For example, the elastomeric component can be an elastomeric metallic rod or bar, an elastomeric cord, or an elastomeric strip.

The storage can also include a selectively opened closure for closing an opening in the sheet of material when access to the volume is not required. Suitable closure components include, for example, a zipper, a mechanical fastener, and a hook and loop fastener.

In another embodiment, a plurality of openings are formed into the sheet of material, providing selective access into a corresponding plurality of volumes defined by the sheet.

In yet another embodiment, the volume comprises an interior of a drawer. The drawer is disposed in the housing of the interactive display system and configured so that when the drawer is closed, the drawer does not extend into the housing sufficiently far to interfere with the operation of the interactive display system.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive.

Exemplary Interactive Display System

Figure 1:
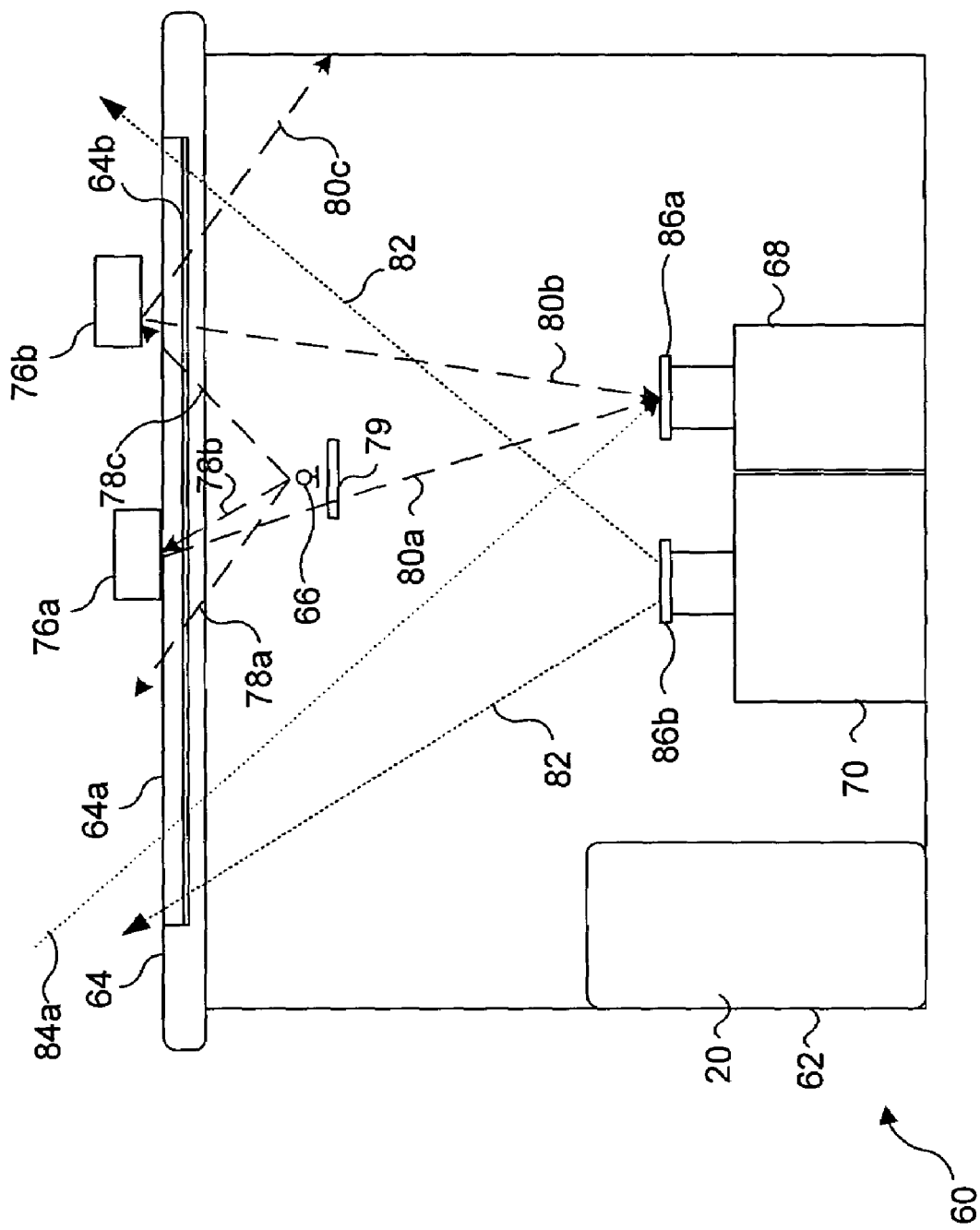
FIG. 1 is a cross-sectional schematic view of one embodiment of an interactive display system, which is able to display graphic and text images on a display surface, as well as respond to physical objects that are proximate to the display surface.

In FIG. 1, an exemplary interactive display table 60 is shown that includes PC 20 within a housing and which serves as both an optical input and video display device for the PC. It should be emphasized that the subject matter discussed herein can be implemented in connection with interactive display systems using other types of display surfaces and with other types of interactive display systems besides the one shown in FIG. 1. To serve as an interactive display system, the system should produce an image of a graphical object on a display surface, as well as respond to movement or disposition of a physical object proximate to (or in contact) with the display surface.

In the cross-sectional view of the exemplary interactive display table in FIG. 1, rays of light used for displaying text and graphic images are generally illustrated using dotted lines, while rays of IR light used for sensing objects on or just above a display surface 64a of the interactive display table are illustrated using dash lines. Display surface 64a is set within an upper surface or top 64 of the interactive display table. The perimeter of the top of the interactive display table is useful for supporting a user's arms or other objects, including objects that may be used to interact with the graphic images or virtual environment being displayed on display surface 64a. When not in use, these objects are desirably stored in a storage provided for the interactive displays system, as described in regard to several different embodiments below. However, to simplify the drawing, none of these embodiments of the storage is shown in FIG. 1.

IR light sources 66 preferably comprise a plurality of IR light emitting diodes (LEDs) and are mounted on the interior side of housing (but can alternatively be mounted along the edges of the display surface). The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of housing to provide an even illumination of display surface 64a. The IR light produced by the IR sources may:

exit through the table surface without illuminating any objects, as indicated by dash line 78a;
illuminate objects on the table surface, as indicated by dash line 78b; or
illuminate objects a short distance above the table surface but not touching the table surface (i.e., proximate to the table surface), as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface in this embodiment of the interactive display system, as an object approaches the top of display surface 64a, the amount of IR light that is reflected by the object increases to a maximum level that is achieved when the object is actually in contact with the display surface.

A digital video camera 68 is mounted to housing below display surface 64a in a position appropriate to receive IR light that is reflected from any touch object or hover object disposed on or proximate display surface 64a, respectively. Digital video camera 68 is equipped with an IR pass filter 86a that transmits only IR light and blocks ambient visible light traveling through display surface 64a, e.g., along a dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a, for producing an image of IR light reflected from objects on or above the display surface. It will be apparent that digital video camera 68 will also respond to any IR light included in the ambient light that passes through display surface 64a from above and into the interior of the interactive display system (e.g., ambient IR light that travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or
reflected or absorbed by other interior surfaces within the interactive display without entering the lens of digital video camera 68, as indicated by dash line 80c.

Translucent layer 64b diffuses both incident and reflected IR light. Thus, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm or palm) may be above the table, while another portion (such as the user's finger) is in actual contact with the display surface. In addition, an object may include an IR light reflective pattern or coded identifier (e.g., a bar code) on its bottom surface that is specific to that object or to a class of related objects of which that object is a member. Accordingly, although not pertinent to the present subject matter, the imaging signal from digital video camera 68 can also be used for detecting each such specific object, as well as determining its orientation, based on the IR light reflected from its reflective pattern, in accord with the present invention.

PC 20 may be integral to interactive display table 60 as shown in FIG. 1, or alternatively, may instead be external to the interactive display table (not shown). If the interactive display table is connected to an external PC 20 or to some other type of external computing device, such as a set top box, video game, laptop computer, or media computer (none shown), then the interactive display table comprises an input/output device. It is also contemplated that as the speed of wireless connections continues to improve, the interactive display table might also be connected to a computing device such as PC 20 via such a high-speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table.

An important and powerful feature of the interactive display table is its ability to display graphic (and/or text) images or a virtual environment for games or other software applications and to enable an interaction between the graphic image or virtual environment visible on display surface 64a and identify objects that are resting atop the display surface, such as object 76a, or are hovering just above it, such as object 76b. Again referring to FIG. 1, interactive display table 60 includes a video projector 70 that is used to display graphic images, a virtual environment, or text information on display surface 64a. The video projector is preferably of a liquid crystal display (LCD) or digital light processor (DLP) type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. Projected light traveling from the projector lens along dotted path 82 onto translucent layer 64b, which is at the focal point of the projector lens, so that the projected image is visible and in focus on display surface 64a for viewing.

Storage Embodiments for Interactive Display Systems

Figure 2:
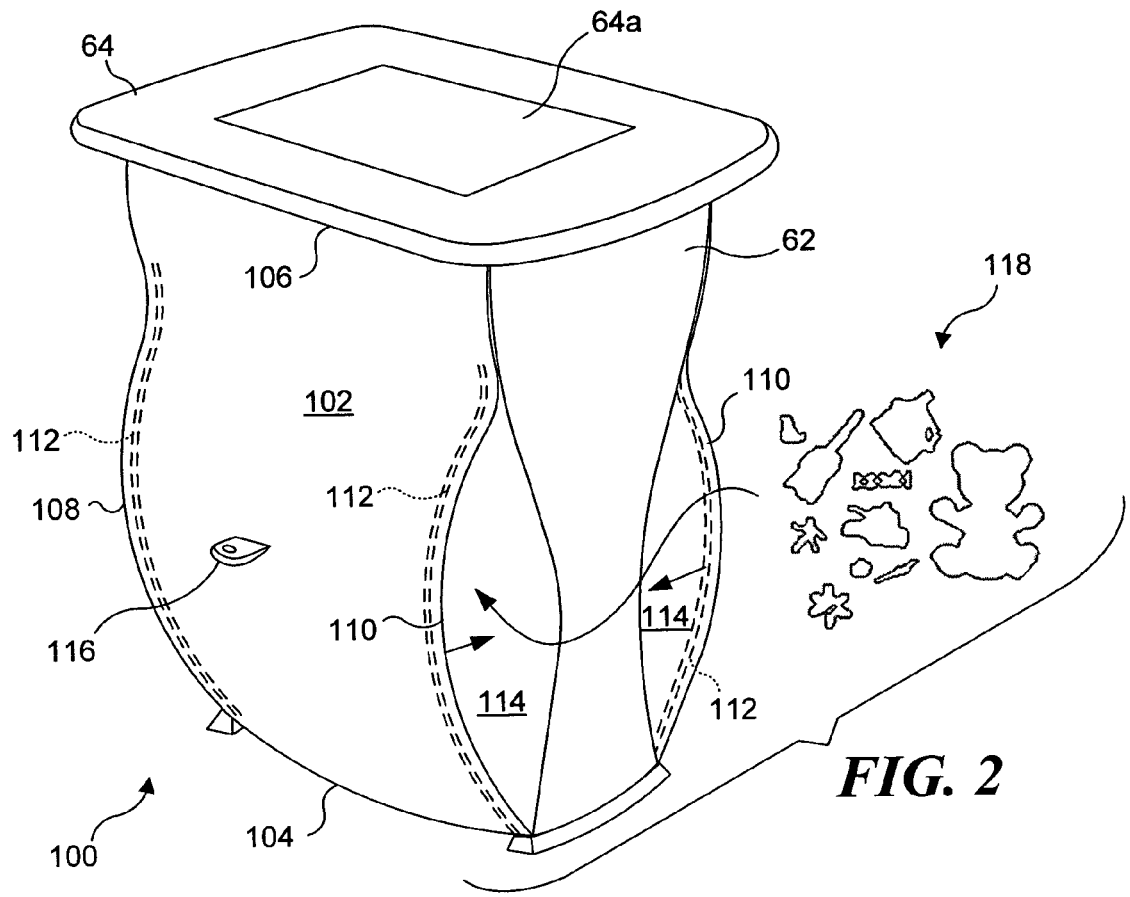
FIG. 2 is an isometric view of a first embodiment of storage that is integral with an interactive display system generally like that of FIG. 1, showing how the storage is opened for insertion or withdrawal of exemplary objects, e.g., objects used with the interactive display system.
Figure 3:
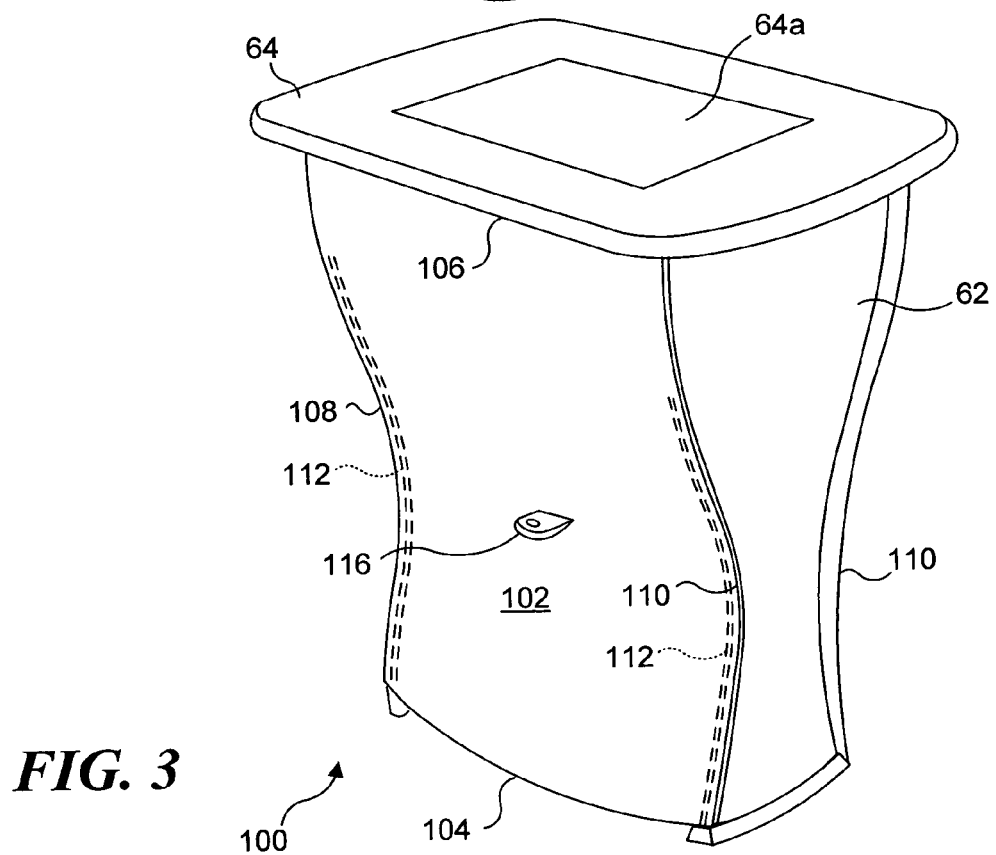
FIG. 3 is an isometric view of the first embodiment of the storage, after the storage has been allowed to close.

As should be evident from the schematic view shown in FIG. 1, the components and optical paths required for operation of the interactive display system leave very little internal volume that is usable for storage within housing 62 without interfering with its operation. Accordingly, several different embodiments have been developed for storage usable with various versions of the interactive display system and suitable for storing objects such as those used with the interactive display system. FIGS. 2 and 3 illustrate a first embodiment of a storage 100 that is suitable for use with a version of the interactive display system in which housing 62 is generally concave on opposite sides. However, this embodiment is not constrained to use with a concave housing, but is also using with housings of different shapes, including straight sided housings.

Storage 100 can be provided on either one or both concave sides of housing 62 in this exemplary embodiment. On each concave side of housing 62 where storage 100 is provided, a generally quadrilateral sheet 102 of fabric or other flexible material is coupled to the outer surface of the housing. For example, sheet 102 can be coupled to the outer surface of the housing at a top edge 106 of the sheet and also at an opposite bottom edge 104, using appropriate fasteners, a suitable adhesive, or a clamping mechanism (not shown). Sheet 102 can optionally be formed with an inherent elastomeric bias that tends to conform the sheet to the shape of housing 62. Alternatively, elastomeric bars or rods 112 can be fitted within sleeves (not separately shown) formed adjacent to edges 108 and 110 that extend generally between top edge 106 and bottom edge 104. Bars or rods 112 can be biased to conform to the concave shape of housing 62, applying a force as shown by the arrows in FIG. 2 that tends to cause the sheet to conform to the contour of the concave sides of housing 62, generally as shown in FIG. 3. Again, it should be noted that the housing need not be concave and the provided bias force would also be useful in connection with housings having different shapes.

A handle 116 is formed generally at the center of sheet 102 and is adapted to be grasped by a user and pulled outwardly away from housing 62 to provide access to a volume 114 in which objects, such as exemplary objects 118, can be inserted for storage and quick retrieval when needed. The outer surface of housing 62 and the inner surface of sheet 102 together define volume 114.

Exemplary objects 118 can include a variety of components that are used on interactive display surface 64a, for example, when playing electronic games or for other interactions with the interactive display system. Each time that an object needs to be stored or retrieved from volume 114, a user would simply grasp handle 116, pulling sheet 102 away from the side of housing 62 in opposition to the biasing force produced by the sheet or by elastomeric bars or rods 112. Volume 114 can thus be accessed from either edge 108 or edge 110 to facilitate access by either left or right-handed users. When handle 116 is released by the user, the bias force produced by sheet 102 or by elastomeric bars or rods 112 closes the opening into volume 114 so that the objects within the volume are retained there until next accessed by a user. The same storage can optionally be provided on each side of the interactive display system housing, or alternatively, may only be provided on one side to minimize the time required to find an object within the storage.

Figure 4:
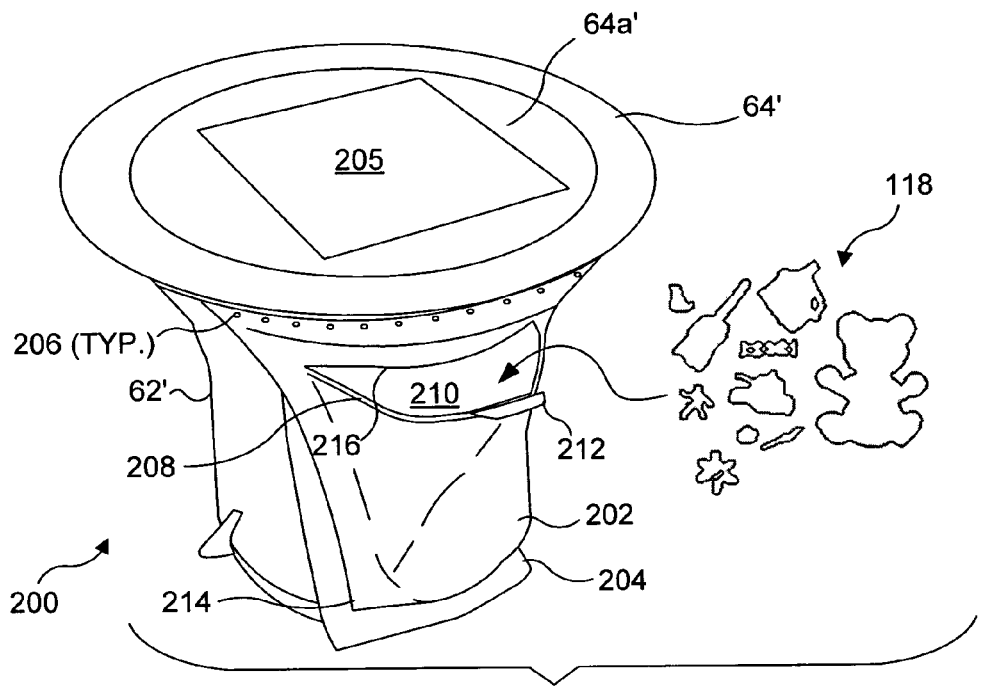
FIG. 4 is an isometric view of a different embodiment of the interactive display system, showing a second embodiment for an integral storage, showing the integral storage open to enable insertion or withdrawal of objects.
Figure 5:
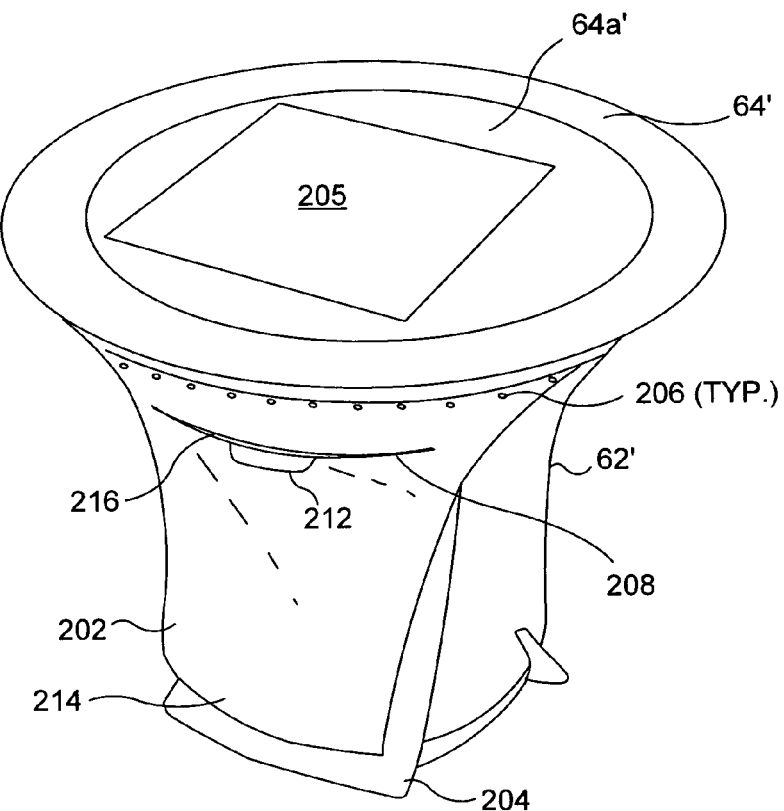
FIG. 5 is an isometric view of the embodiment of the interactive display system of FIG. 4, showing the second embodiment of the integral storage, as it appears when closed.

FIGS. 4 and 5 illustrate a second embodiment of a storage 200 for use with another version of the interactive display system. This version of the interactive display system includes a housing 62' having a generally round display surface 64a' that is set within an annular top 64'. A backing 204 and a sheet 214 define a pocket 202 that can be used for holding objects such as exemplary objects 118. In this exemplary embodiment, backing 204 and sheet 214 are coupled to housing 62' under top 64' using a plurality of fasteners 206. Access to a volume 210 defined within pocket 202 is achieved by grasping a handle 212 formed along an elastomeric edge 208 comprising a side of a slot 216 formed within sheet 214 and pulling the handle away from housing 62'. Exemplary objects 118 can then be readily inserted or withdrawn from volume 210. When handle 212 is released, the biasing force provided by elastomeric edge 208 closes the opening, as shown in FIG. 5. Again, any object used for interacting with a graphic display image 205 projected onto interactive display surface 64a' can readily be retrieved from within pocket 202 by pulling handle 212 to access volume 210. Elastomeric edge 208 can be formed along slot 216 with conventional bias tape, or using another elastomeric plastic or metal strip or rod sewn into a sleeve formed along that edge of the slot. A similar storage 200 could also be provided on the opposite side of the interactive display system. Also, it will be apparent that backing 204 is not required, although it does provide some rigidity to the pocket comprising storage 200. However, the pocket can be formed only in sheet 214, if desired.

Figure 6:
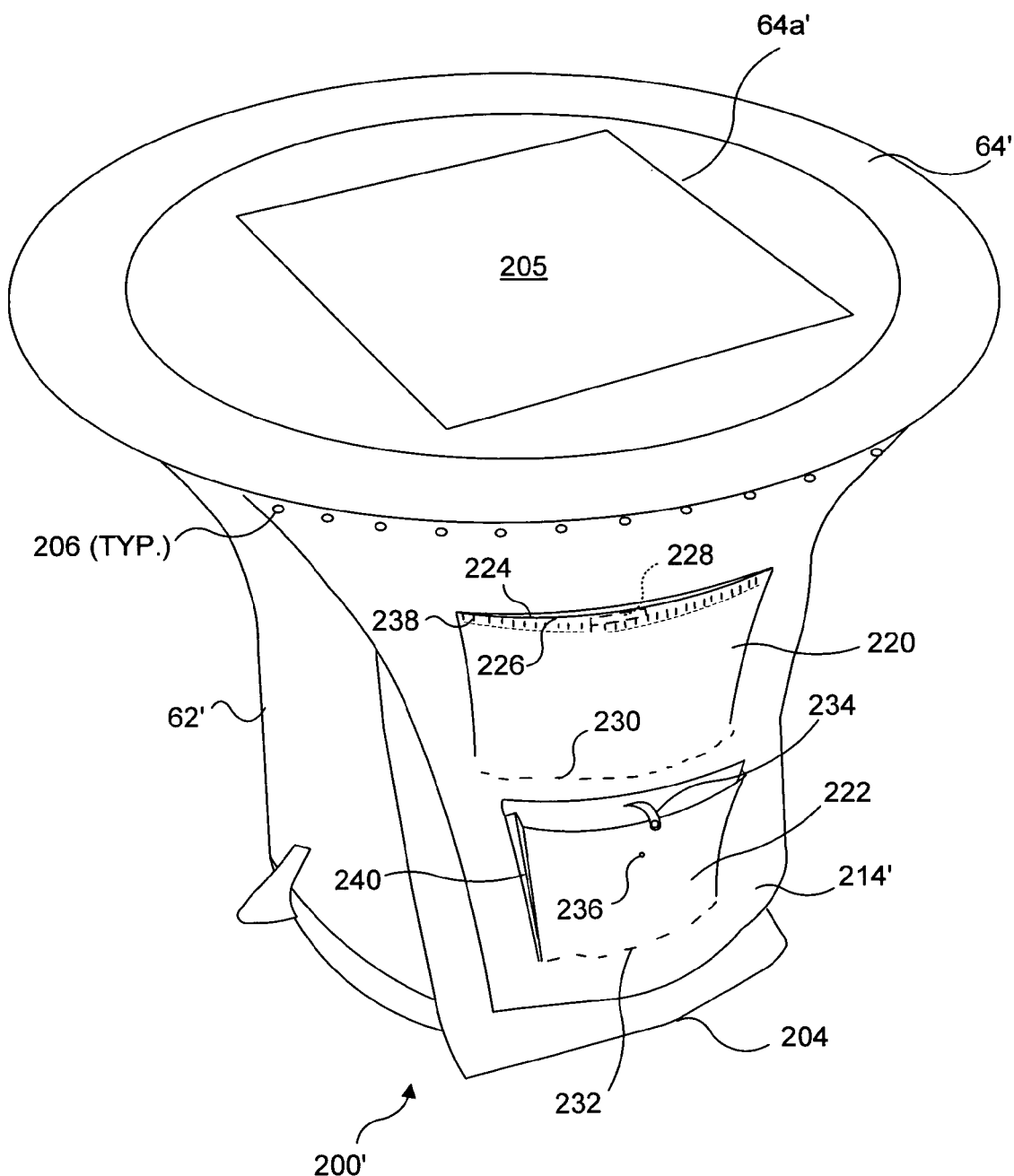
FIG. 6 is an isometric view of a modified version of the second embodiment of the integral storage.

As a further alternative, a storage 200' shown in FIG. 6 includes a pocket 220 and a pocket 222 formed between a sheet 214' and backing 204. The lower edge of pocket 220 is defined along a stitch line 230, while the lower edge of pocket 222 is defined along a stitch line 232 or their conventional means for attaching sheet 214' to backing 204. A slot 224 provides access into pocket 220. A strip of elastomeric bias tape 238 is attached along a lower edge 226 of slot 224, providing a bias force tending to keep slot 224 closed. However, patches 228 comprising hook and loop fastener materials can also be included just within slot 224 to keep the opening into the pocket closed until a user grasps lower edge 226 and pulls it away from backing 204, releasing one of the patches of hook and loop materials from the other. Alternatively, a zipper or other mechanical fastener can be used for closing the slot into the pocket.

Pocket 222 has a different configuration in which an outer surface of the pocket is connected to sheet 214' with pleats 240 along opposite vertical edges. Access to the interior volume of pocket 222 is obtained when a closure strip 234 pulled away, releasing from a mechanical snap fastener 236. It may be desirable to store larger objects in pocket 222, since the pleats provide it a substantially larger available volume than is provided by pocket 220.

Figure 7:
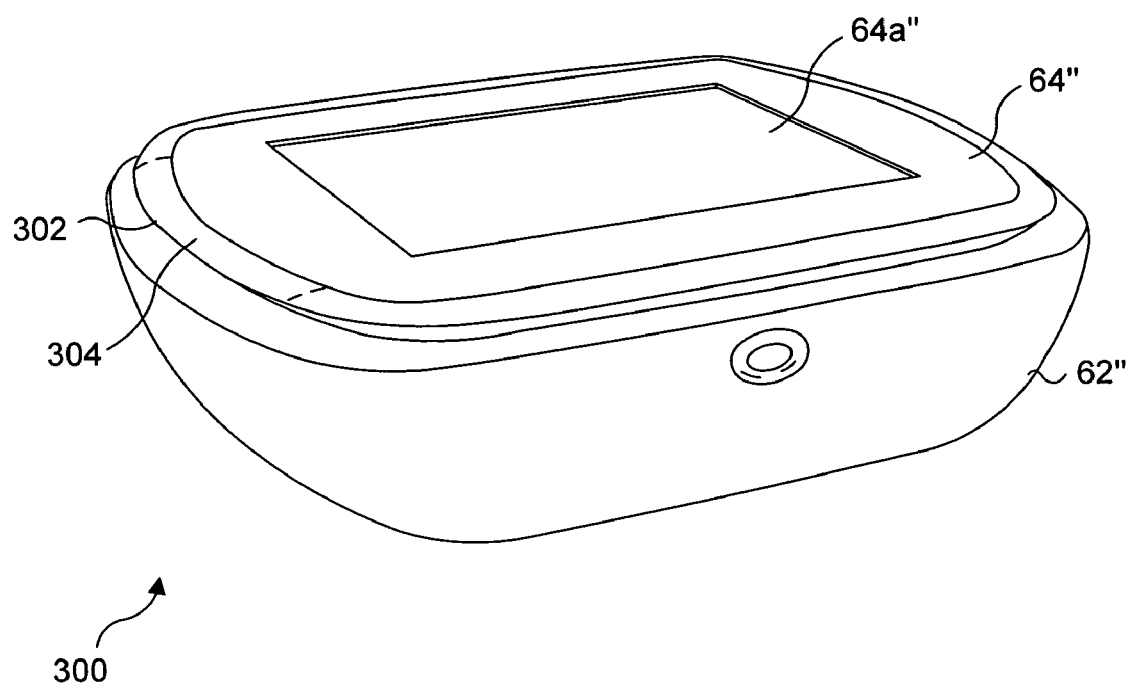
FIG. 7 is an isometric view of a compact embodiment of the interactive display system.
Figure 8:
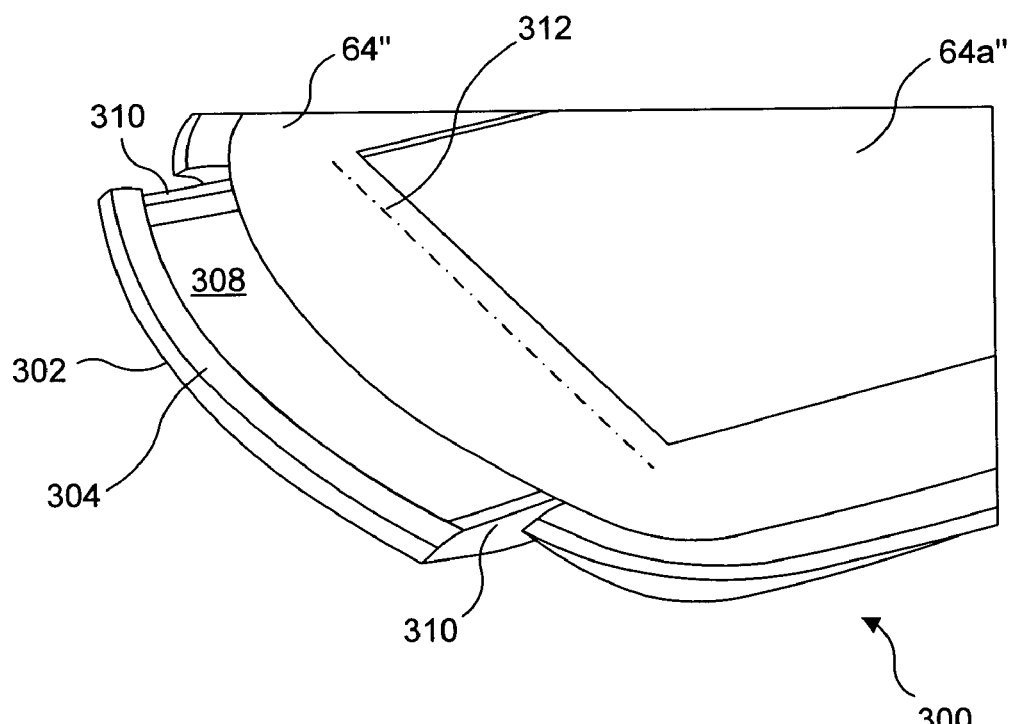
FIG. 8 is an isometric view of the interactive displays system of FIG. 7, showing an integral storage drawer that is open for insertion or withdrawal of objects.

Yet another embodiment of a storage 300 is illustrated in FIGS. 7 and 8. This embodiment differs from the others discussed above, because it employs part of the interior volume of a housing 62" for storage, instead of providing the storage volume externally of the housing. Housing 62" is substantially smaller in size than the housings of the other versions of the interactive display systems discussed above. However, a portion of top 64" has a relatively shallow available interior clearance relative to the optical components and optical paths of the interactive display system sufficient to encompass a drawer 302, as shown in FIG. 8. Drawer 302 has a volume 308 defined by sides 310 and a front lip 304. The back of the door is not shown; however, when drawer 302 is closed, the back does not extend beyond a line 312. Accordingly, drawer 302 does not impinge into the interior of the housing sufficiently far to interfere with the operation of the interactive display system. One advantage of drawer 302 for storing objects, although its volume is relatively small, is that, when drawer 302 is open, objects can readily be swept from interactive display surface 64a", across top 64", and into volume 308. Front lip 304 serves as a handle that can be engaged by a user's fingers tips to open the drawer or pushed to close the drawer.

Although the present concept has been described in connection with the preferred form of practicing it and modifications thereto, those of ordinary skill in the art will understand that many other modifications can be made thereto within the scope of the claims that follow. Accordingly, it is not intended that the scope of this concept in any way be limited by the above description, but instead be determined entirely by reference to the claims that follow.

The invention in which an exclusive right is claimed is defined by the following:

1. A storage container configured for use in an interactive display system, the interactive display system being configured to produce an image of a graphical object on a display surface, as well as respond to movement or disposition of a physical object proximate to or in contact with the display surface, the storage container comprising:

(a) a convex volume that is selectively accessible for storage of objects, including objects that may be usable with an interactive display system, the volume being disposed proximate to a peripheral portion of an interactive display system so that a housing of the interactive display system at least supports the storage, the volume being configured and disposed relative to an interior of the interactive display system so as to avoid interference with operation of the interactive display system, the storage including a volume sleeve with an elastomeric bias that tends to conform the volume sleeve to the convex shape of the housing, the elastomeric bias being provided by a plurality of elastomeric rods embedded within at least two of the edges of the volume sleeve; and (b) a member that is adapted to be engaged by a user to selectively access the volume, the member being attached to the volume sleeve, such that when the member is engaged by the user, the volume sleeve adjusts from the convex form to a concave form.

2. The storage container of claim 1, wherein the volume is further defined between one or more sheets of a flexible material and an outer surface of the housing, the sheet of material being coupled to the housing adjacent at least opposite edges of the sheet.

3. The storage container of claim 2, further comprising an elastomeric component disposed along an edge of the material that urges the flexible material toward the housing to close an opening into the volume.

4. The storage container of claim 3, wherein the elastomeric component comprises one of an elastomeric metallic bar, an elastomeric cord, and an elastomeric strip.

5. The storage container of claim 2, wherein the member comprises one of a handle, at least a portion of an edge of the sheet of material that is not coupled to the housing, an edge of an opening formed in the sheet of material, and a part of the housing that is movable relative to another part of the housing.

6. The storage container of claim 2, further comprising a selectively opened closure for closing an opening in the sheet of material when access to the volume is not required.

7. The storage container of claim 6, wherein the selectively opened closure comprises one of a zipper, a mechanical fastener, and a hook and loop fastener.

8. The storage container of claim 2, wherein a plurality of openings are formed into the sheet of material, providing selective access into a corresponding plurality of volumes defined in the sheet.

* * * * *